C. R. BRINCKERHOFF.
Wheel-Plow
No. 10,101. Patented Oct. 11, 1853.
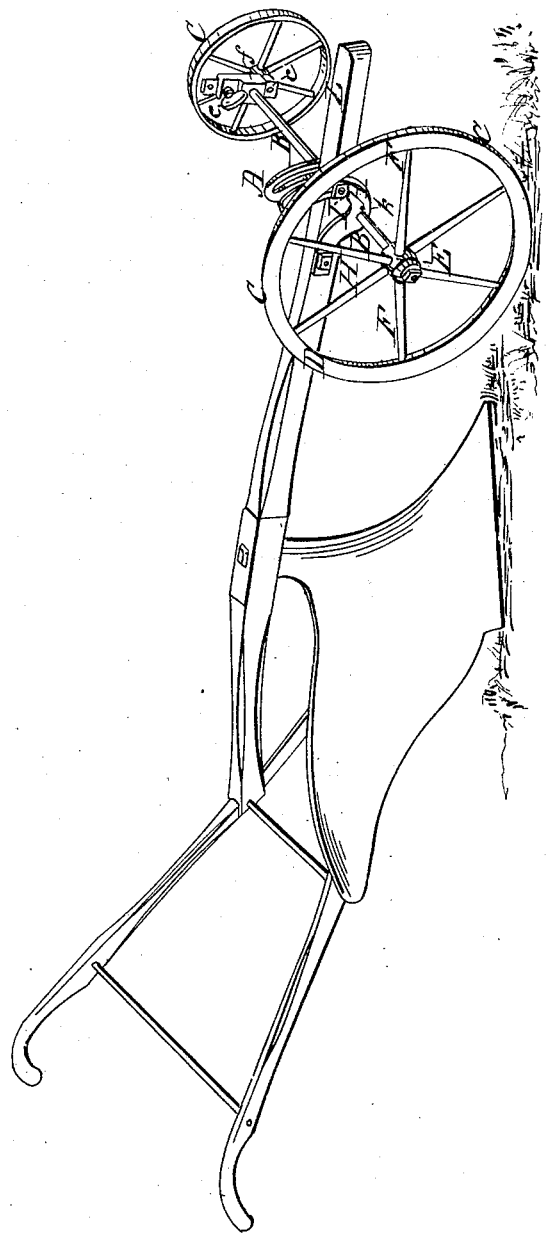

UNITED STATES PATENT OFFICE.

CORNELIUS R. BRINCKERHOFF, OF BATAVIA, NEW YORK.

IMPROVEMENT IN PLOWS.

Specification forming part of Letters Patent No. 10,101, dated October 11, 1853.

*To all whom it may concern:*

Be it known that I, CORNELIUS R. BRINCKERHOFF, of Batavia, in the county of Genesee, and State of New York, have invented a new and Improved Addition to be Attached to the Common Plow, which I call the "Self-Holding and Furrow-Gage Improvement," and can be attached to any plow now in use; and I do hereby declare that the following is a full and exact description thereof, reference being had to the accompanying drawing, and to the letters of reference marked thereon.

The nature of my invention consists in attaching to any common plow two wheels of different sizes and shapes, the small one to run upon the land, the large one to run in the bottom of the furrow with its side against the land by a movable iron axle passing through holes in the lower part of two common cast-iron lifters or supporters, which are attached to the beam, one on each side, which have the effect of holding the plow perfectly steady and regulating both the depth and width of the furrow-slice. (See drawing.)

The lifters or supporters A on each side of the beam are fastened with a bolt, H, running through the beam about eighteen inches back of the clevis, one sickle-shaped and bolted fast at the handle end, upon which they are turned as on a pivot. Holes K are made in the lower part of the curve for the axle B to pass through, and the axle is elevated or lowered by means of a set-bolt, I, passing through a slot in the sickle end of each of said lifters or supporters and through the beam L of the plow, and the elevating or depressing of the axle in this way regulates the depth of the slice.

The axle is made of wrought-iron, is about three feet long, and about one and one-quarter inch in diameter. It passes through said holes in the supporters, and is fastened by two iron keys or wedges in said holes, by removing which the axle can be moved either way, so that by lengthening or shortening the distance or length of the axle between the plow-beam and the large wheel D, placed on the furrow side of the plow, the width of the furrow is gaged to any desired width and is kept of uniform width. A small cast-iron wheel, G, about thirteen inches in diameter, is placed on the end of the axle, on the landside thereof, with a slip-collar, so that the axle may be taken out of the lifters or supporters when necessary.

A large wheel, D, which I call the "furrow-gage wheel," is placed on the other end of said axle, on the furrow or mold-board side of the plow. This wheel is about thirty inches in diameter, is made with a cast-iron hub, wrought-iron spokes, and a wrought iron rim about two and one-half inches wide, with a very narrow tread. This wheel may have a bevel of about two inches from the land.

The small wheel G maybe placed on a separate short axle, connected with an adjustable side secured in a dovetailed groove in a standard attached to the shaft B, which will allow of adjustment for hillside-plowing, (see *c e f,*) or to vary the depth of furrow.

This plow does not require any person to hold it except at the turning, where it is very easily rolled round upon the large wheel.

The advantages of this improvement are apparent. A small boy can plow therewith as much and better than the best plowman without it. All he has to do is to drive the team and at the end balance the plow on the large wheel. More work can be done and with greater ease. In turning the team does not get entangled in the harness and whiffletrees. The width of the slice is regulated with great precision, and must continue uniform. The slice must always be turned, as the plow runs steady and level. Stones and other obstructions cannot effect this plow as much as the common plow. Unless the plow strikes fast against some obstruction, stone, or other obstacle it will rise over the obstruction and of itself will immediately take hold of the land again. The advantages of the sharp beveled rim and narrow tread of the large wheel are many. This wheel runs lightly, pressing lightly against the land, gaging the width of the furrow-slice, and will cast aside any small stones that may roll against the land which a broad tread would have to surmount, and might cause the plow to throw out. The flat side of the wheel is supported and steadied against the land.

For making the first furrow the wheels may be raised, if desired, and afterward the wheels are depressed, so that the small wheel shall rest upon the land and the large one on the bottom of the furrow already made. The team is then started, and the plow without other aid is drawn into the ground to the depth desired. The wheels gage the depth to which the plow shall cut. The furrow-wheel, working against the land on the inside of the furrow already made, gages the width of the next furrow or the distance the plow shall run to land. The plow, being properly supported on both sides and held down by the share, cannot fall upon its sides, and is held with great accuracy in position, requiring only a boy to drive the team, no person being required to hold.

The plow, when required, is turned out in the usual way and rests upon the heel and the large wheel, and may thus be moved from place to place without plowing, and the whiffletrees and traces are held high up from the ground.

Having thus fully described my invention and the operation of the same, what I claim therein as new and valuable, and desire to secure by Letters Patent, is—

1. Combining with the plow-beam between the plow and the clevis two wheels, one on each side of the beam and of different diameters, the one resting on the furrow and the other on the land, for the purpose set forth and described.

2. Making the tread of the furrow-wheel narrow, for the purposes described.

3. Making the said wheels, especially the furrow-wheel, adjustable in the direction of its axis for the purpose of adapting its position to furrows of different widths.

4. Making said wheels adjustable vertically to adapt them to the plowing of furrows of different depths and for making the first furrow.

5. Making the furrow-wheel beveling outward on the side which presses against the land, as above described, and for the purposes hereinbefore set forth.

6. Making the small wheel adjustable vertically with reference to the shaft B, as described.

CORNELIUS R. BRINCKERHOFF.

Witnesses:
EDGAR C. DIBBLE,
H. U. SOPER.